United States Patent [19]
Kim

[11] Patent Number: 5,990,985
[45] Date of Patent: Nov. 23, 1999

[54] DISPLAY APPARATUS WITH SHIELD UNIT EASILY MOUNTED

[75] Inventor: Kwey-Hyun Kim, Suwon, Rep. of Korea

[73] Assignee: SamSung Electronics Co., Ltd., Suwon, Rep. of Korea

[21] Appl. No.: 08/995,553

[22] Filed: Dec. 22, 1997

[30] Foreign Application Priority Data

Dec. 21, 1996 [KR] Rep. of Korea ................ 96/53554

[51] Int. Cl.⁶ .................................................. H04N 5/645
[52] U.S. Cl. ..................... 348/836; 348/826; 348/789; 348/787; 312/7.2; 361/682
[58] Field of Search ............................. 348/818–820, 348/821, 825–826, 836, 839, 843, 787, 789; 312/7.2; 361/681, 682; H04N 5/645

[56] References Cited

U.S. PATENT DOCUMENTS

| | | | |
|---|---|---|---|
| 5,363,150 | 11/1994 | Kojima | 348/836 |
| 5,673,982 | 10/1997 | Chase et al. | 348/836 |
| 5,691,781 | 11/1997 | Siccardo | 348/836 |
| 5,699,132 | 12/1997 | Adachi et al. | 348/836 |
| 5,742,360 | 4/1998 | Kwon et al. | 348/839 |
| 5,764,313 | 6/1998 | Schlatmann | 348/825 |
| 5,823,641 | 10/1998 | Goto et al. | 312/7.2 |
| 5,863,106 | 1/1999 | Beak | 361/682 |

*Primary Examiner*—Vu Le
*Attorney, Agent, or Firm*—Robert E. Bushnell, Esq.

[57] ABSTRACT

A display apparatus with a shield unit which is easily mounted includes: a cathode ray tube for displaying images; a first cover in which the cathode ray tube is assembled; a cathode ray tube bracket fixed to the front case for supporting the cathode ray tube, and having a reeve in the rear, a shield cover installed in the rear of the cathode ray tube bracket for shielding an electric field, and having a coupling unit in the front; a guiding rail for shielding an electric field, and of the shield cover with the reeve formed on the cathode ray tube bracket; and a second cover coupled with the first cover for covering the shield cover.

15 Claims, 9 Drawing Sheets

DISPLAY APPARATUS WITH SHIELD UNIT EASILY MOUNTED

CLAIM OF PRIORITY

This application makes reference to, incorporates the same herein, and claims all benefits accruing under 35 U.S.C. §119 from an application for *DISPLAY APPARATUS WITH SHIELD UNIT EASILY MOUNTED* earlier filed in the Korean Industrial Property Office on the of Dec. 21, 1996 and there duly assigned Ser. No. 53554/1996.

BACKGROUND OF THE INVENTION

1. Technical Field

The present invention relates to a display apparatus with improved mounting of a shield unit for shielding an electric field with a rail coupling means.

2. Related Art

The assembly of display apparatus can be very complex, time consuming and inconvenient. This is due to the fact that, typically, such display apparatus include numerous components, such as a front cover, cathode ray tube (CRT), CRT bracket, shield cover, and rear cover, as well as a main circuit board and a board frame which are associated with each other and which underly the CRT bracket and shield cover.

In assembling these numerous components, various sets of screws are typically used to interconnect the various components. However, during the assembly process, it is necessary for the assembler to manipulate the various components in order to correctly align the screw holes for the purpose of facilitating insertion of the screws to interconnect components. During this process, the various components can inadvertently impact on the underlying main circuit board, thus raising the possibility of damage to the circuit board elements and components.

Therefore, there is a need for an improved display apparatus so that assembly is more convenient and there is no possibility of damage to the electrical components of the display apparatus.

SUMMARY OF THE INVENTION

Accordingly, the present invention is directed to a display apparatus with a shield unit which is easily mounted so as to substantially obviate one or more of the problems, limitations and disadvantages of the related art as discussed herein.

An object of the present invention is to provide a display apparatus which is designed to facilitate mounting of a shield unit for shielding the electric field.

To achieve this object, in mounting a shield cover on a bracket, the invention calls for the shield cover to be designed so that it is inserted along a rail guide, and therefore prevents tottering during assembly, resulting in ease in mounting.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof, as well as in the appended drawings.

To achieve these and other advantages in accordance with the purpose of the present invention, as embodied and broadly described, a display apparatus with a shield unit easily mounted of the invention includes a cathode ray tube for displaying images; a first cover in which the cathode ray tube is assembled; a cathode ray tube bracket fixed to the front case for supporting the cathode ray tube, and having a reeve in the rear; a shield cover installed in the rear of the cathode ray tube bracket for shielding an electric field and having a coupling unit in the front; a guiding rail for coupling the coupling unit installed in the front of the shield cover with the reeve formed on the cathode ray tube bracket; and a second cover coupled with the first cover for covering the shield cover.

It is to be understood that both the foregoing general description and the following detailed description are exemplary and explanatory and are intended to provide further explanation of the invention as claimed.

BRIEF DESCRIPTION OF THE ATTACHED DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENT

Reference will now be made in detail to the preferred embodiments of the present invention, examples of which are illustrated in the accompanying drawings.

Figure 1:
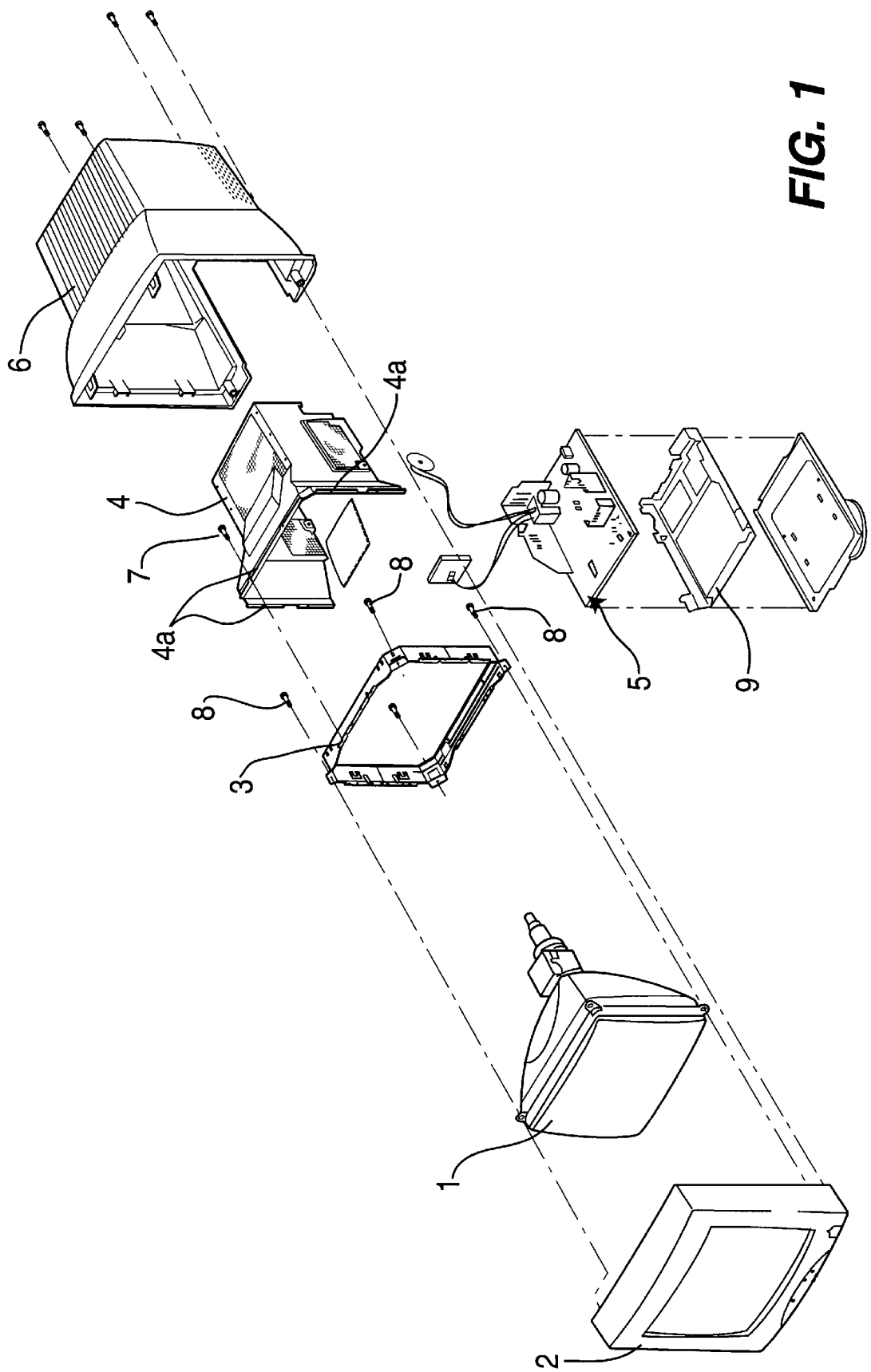
FIG. 1 is an exploded perspective view showing the entire structure of a prior display apparatus.
Figure 2:
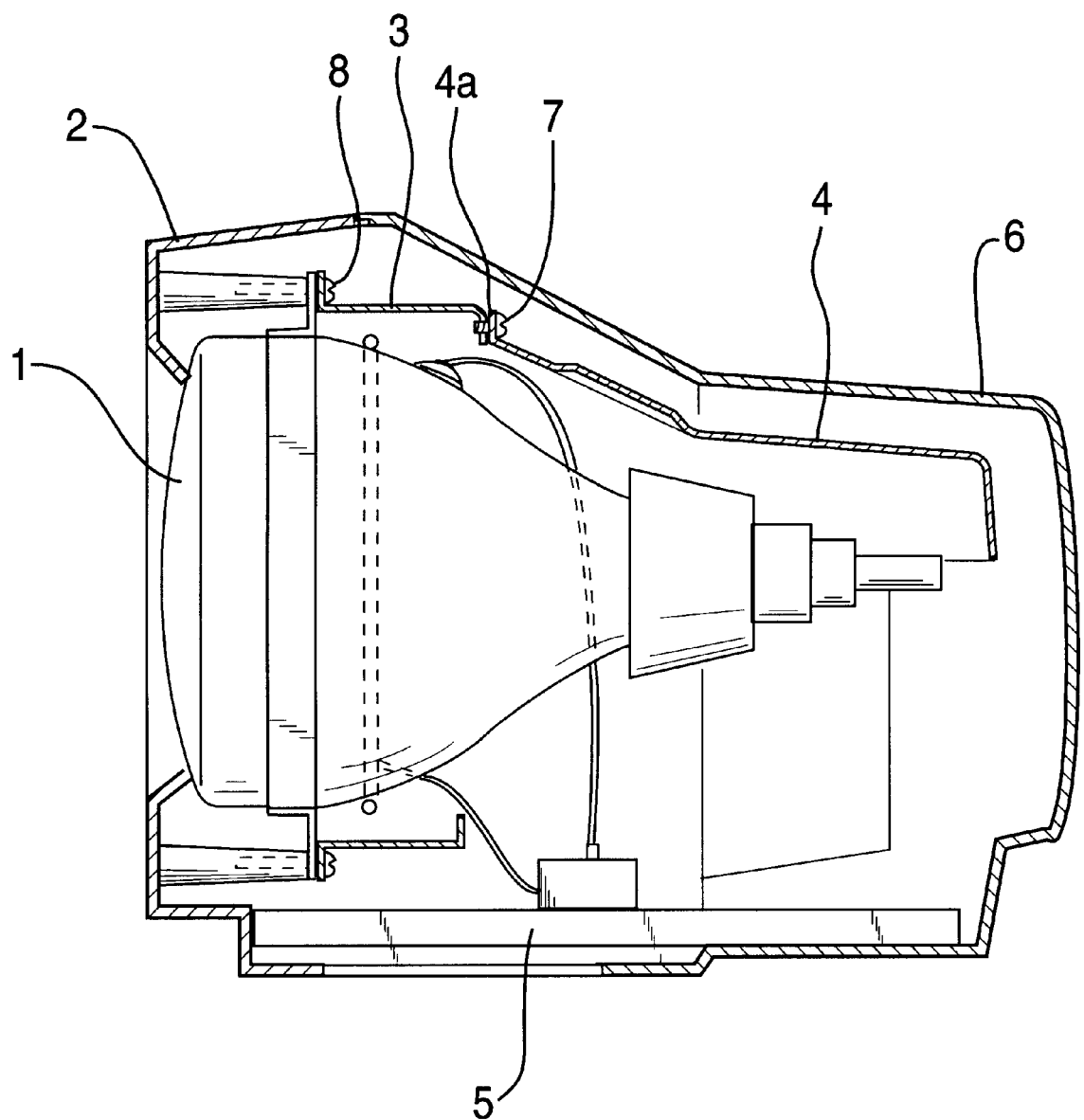
FIG. 2 is a sectional view showing one side of the prior display apparatus.
Figure 3:
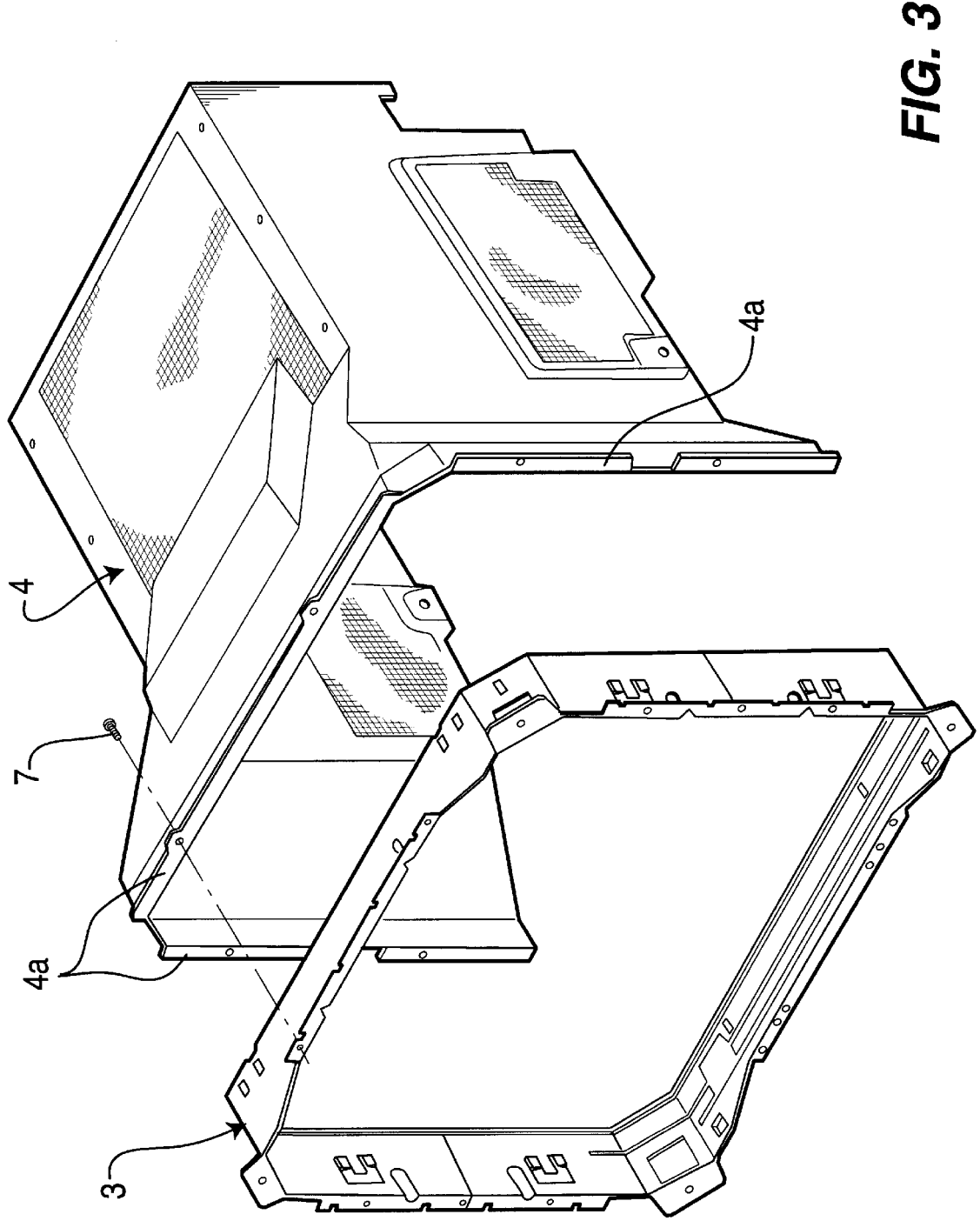
FIG. 3 is an exploded perspective view showing a main part of the prior display apparatus.
Figure 4:
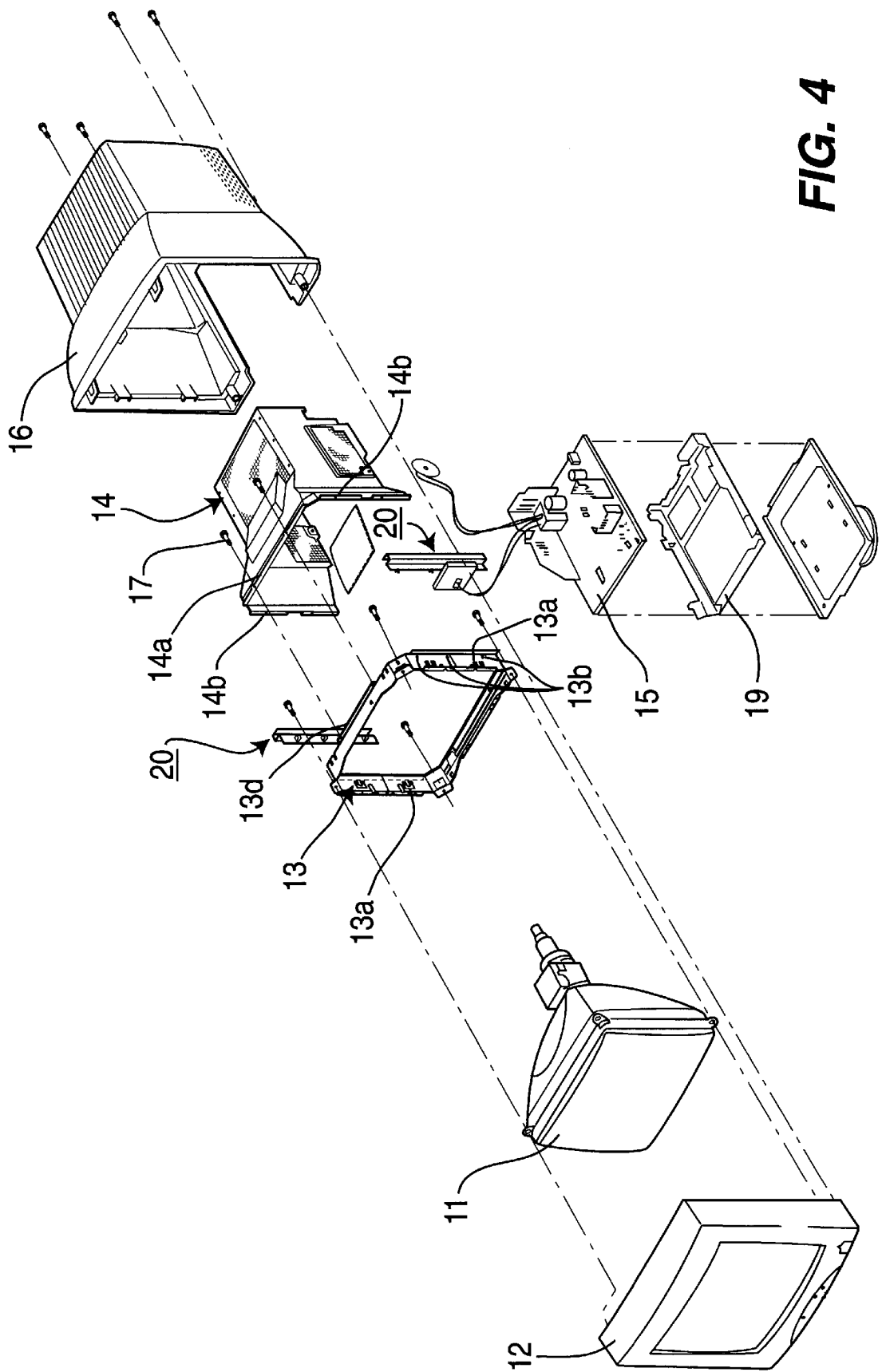
FIG. 4 is an exploded perspective view of the entire structure of a display apparatus according to one embodiment of the invention.

Generally, as illustrated in FIGS. 1 to 3, the display device has a cathode ray tube (CRT) 1, a front cover 2 to which the CRT is coupled, a CRT bracket 3 for supporting the CRT, and a shield cover 4 mounted on the CRT bracket 3 for blocking an electric field. Under the CRT 1, a main circuit board 5 is installed, and a rear cover 6 is integrally formed to the rear of the front cover 2. The shield cover 4 forms a general chassis having a fixing piece unit 4a bent to stand on the front edge, and is fixed to the CRT bracket 3 with screws 1.

In mounting the shield cover 4 by means of screws 7 and 8, the assembly procedure is inconvenient and requires a lot of attention.

That is, assembly of the display apparatus is performed in the following manner. The front cover 2, the CRT 1 and the CRT bracket 3 are fixed by screws 8. Under the CRT 1, a board frame 9 associated with the main circuit board 5 is installed. The shield cover 4 is fixed to the CRT bracket 3 by screws 7, and the rear cover 6 is coupled therewith. In mounting the shield cover 4, with the board frame 9 attached to the main circuit board 5, the bracket 3 is coupled by screws 8 extending from the rear to the front cover 2 to make the shield cover 4, the CRT bracket 3 and the front cover 2 coincide with each other.

Even though the bottom side of the shield cover 4 is opened, as an assembler assembles the unit at his option, there may be variation in the arrangement. Due to its tottering, its both ends of the unit may contact the cables on the main circuit board 5 and other circuit components, and cut off cables or damage the components. Thus, alot of attention is needed. Accordingly, it takes too much time to assemble the units carefully, and this causes inconvenience and inferior assembly.

In addition, as the shield cover 4 is fixed to the CRT bracket 3 by screws 7, coupling holes in the shield cover 4 and the CRT bracket 3 must coincide with each other to thereby guide in the screws 7. This may cause more inconvenience and loss of time in assembly.

FIGS. 4 to 8 illustrate an embodiment of a display apparatus of the invention.

The display apparatus includes a cathode ray tube (CRT) 11; a first or a front cover 12 which is assembled with CRT 11; a CRT bracket 13 for supporting CRT 11; a shield cover 14 mounted on the CRT bracket 13 for shielding an electric field; a main circuit board 15 firstly installed on the board frame 19 and under the CRT bracket 13; a bottom chassis frame 18 fixed to the board frame 19; and a second or rear cover 16 which is assembled with the front cover 12. The CRT 11 and the CRT bracket 13 are fixed to the front cover 12 by screws, and the shield cover 14 is installed to the rear of the CRT bracket 13 by a rail mounting means.

Figure 5:
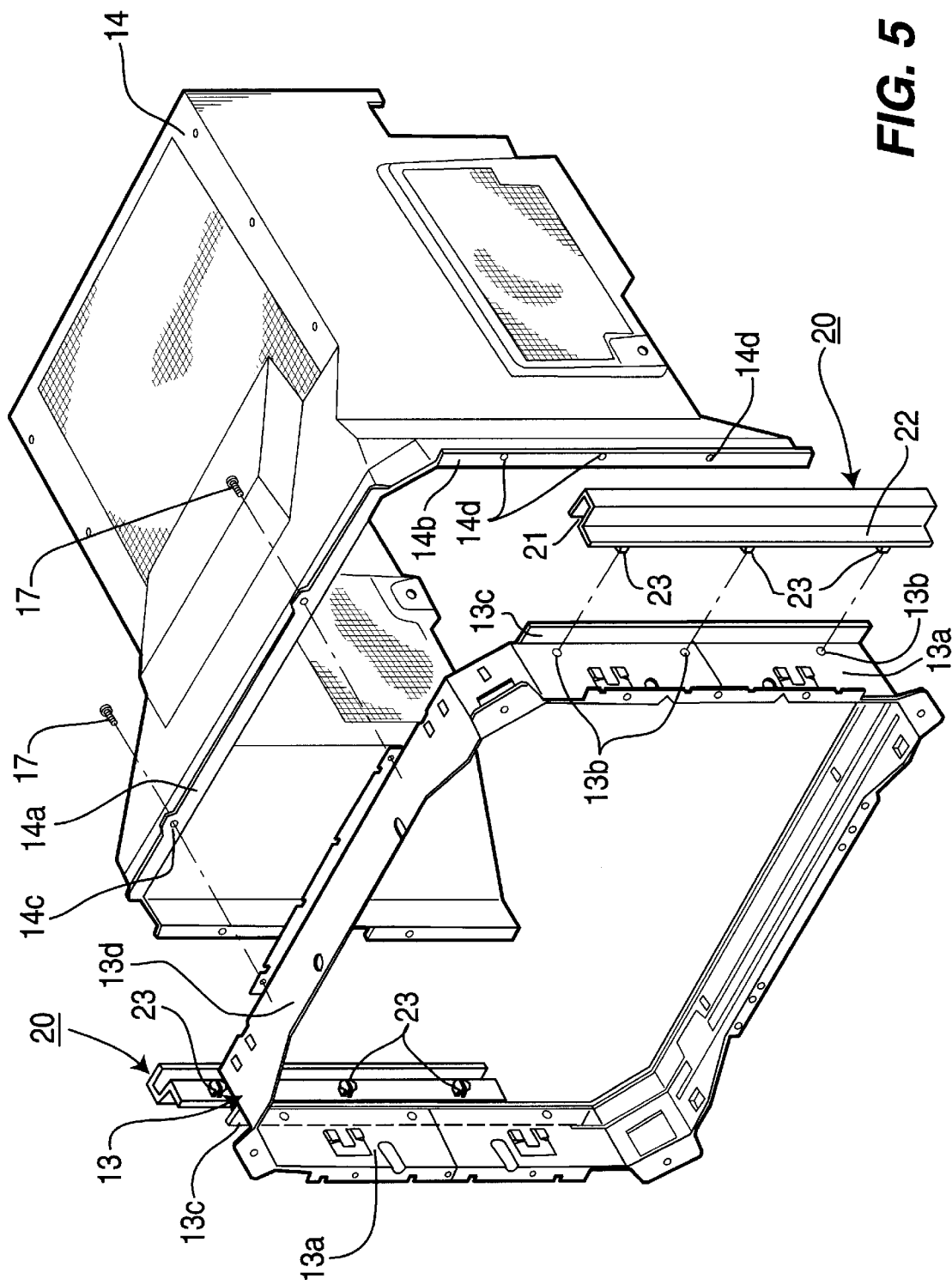
FIG. 5 is an exploded perspective view showing the main part according to one embodiment of the invention.
Figure 6:
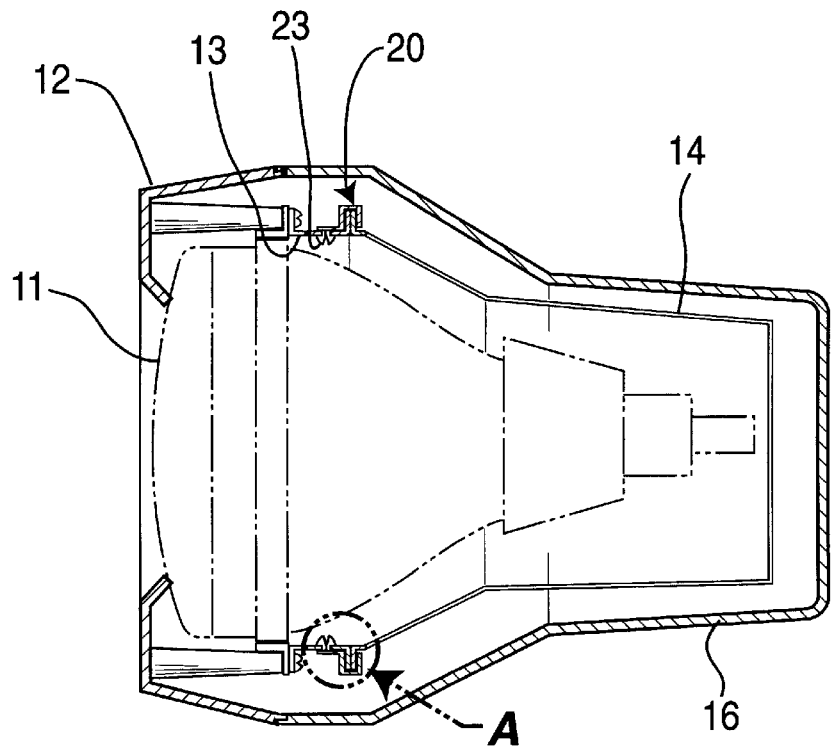
FIG. 6 is a plan sectional view of the display apparatus according to one embodiment of the invention.

The rail mounting means, as shown in FIG. 5, has an additional guiding rail 20. The guiding rail 20 has a rail flute 21 of the same length as the CRT bracket 13. A plurality of coupling snaps 23 protrude at equal intervals on a reeve piece 22 formed on a side of the rail flute 21. Each of the coupling snaps 23 has a dividing groove 23a and a projection 23b. If the coupling snap 23 passes through the coupling hole 13b formed on a side 13a of the CRT bracket 13, the projection 23b is snapped into the CRT bracket 13.

Figure 7:
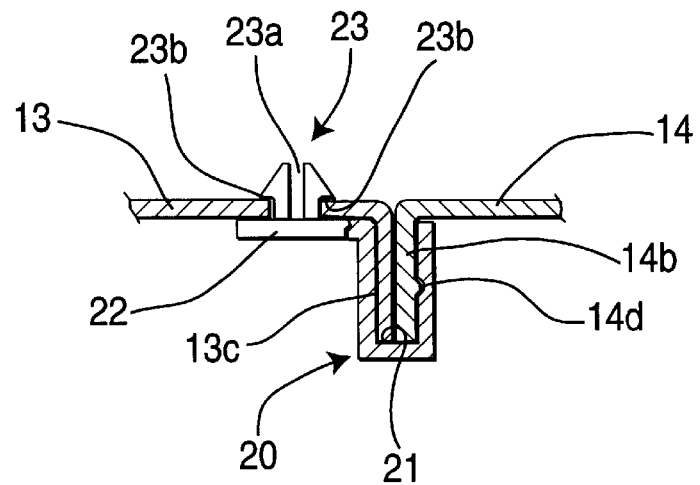
FIG. 7 is an enlarged sectional view of the "A" portion of FIG. 6.

FIG. 7 illustrate a state where the guiding rail 20 is coupled with the side 13a of the CRT bracket 13. Coupling of the guiding rail 20 is performed on both sides of the CRT bracket 13. In coupling the guiding rail 20, the reeve piece 13c bent out of the CRT bracket 13 is inserted into the rail flute 21 so as to adhere to its inner surface. Here, the coupling snap 23 of the rail guide 20 prevents the guiding rail 20 from separating from the CRT bracket 13, and the reeve piece 13c inserted into the rail flute 21 prevents the guiding rail 20 from being thrust forwardly because of tottering.

The shield cover 14 for shielding an electric field has an upper coupling piece 14a and side coupling pieces 14b on its frontal verge. Holes 14c through which the screws 17 pass are formed on the upper coupling piece 14a, and a plurality of embossing projections 14d are formed on the side coupling pieces 14b at equal intervals. Therefore, during assembly, the shield cover 14 inserted into the rail flute 21 of the guiding rail 20 and side coupling pieces 14b are coupled on both sides of the CRT bracket 13. To achieve this assembly, the shield cover 4 is assembled up to down, that is, vertically. That is, when the assembly is completed, the upper reeve piece 13d of the CRT bracket 13 coincides with the upper coupling piece 14a of the shield cover 14.

Meanwhile, the side coupling pieces 14b of the shield cover 14, inserted into the rail flute 21 of the guiding rail 2, are inserted by having their embossing projections 14d slightly push the guiding rail 20 outwardly so that it does not totter, thereby maintaining the stable state continuously.

Both sides of the shield cover 14 are fixed by the guiding rail 20, and simultaneously its upper portion is screwed stably.

Figure 8:
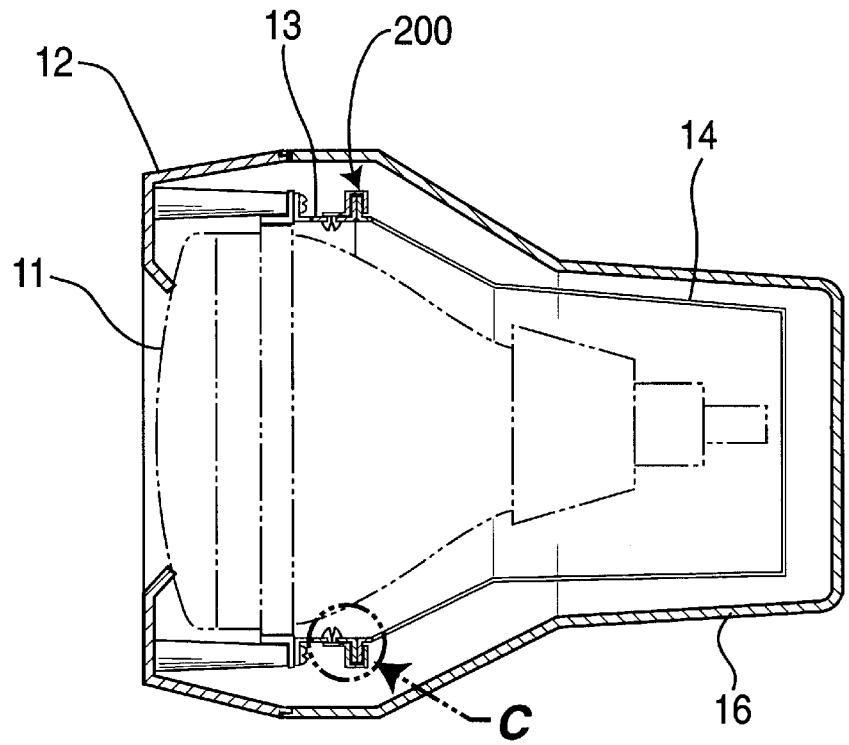
FIG. 8 is a plan sectional view showing the main part of another configuration according to one embodiment of the invention.
Figure 9:
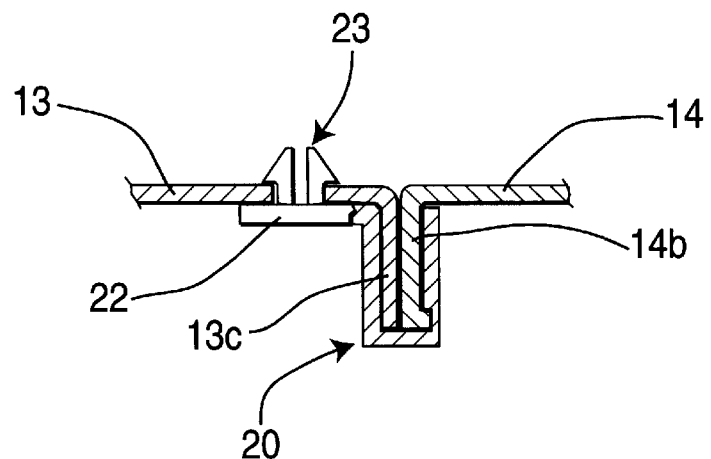
FIG. 9 is a side sectional view showing the entire structure of the display apparatus according to one embodiment of the invention.

FIG. 8 shows another configuration according to one embodiment of the invention. Side coupling pieces 14b are "⊏"-shaped. The rail flute 21 of the guiding rail 20, into which the "⊏"-shaped side coupling pieces 14b are inserted, has the same shape as the side coupling pieces 14b so that it can be coupled without the embossing projections 14d of FIG. 5, thereby preventing tottering.

Figure 10:
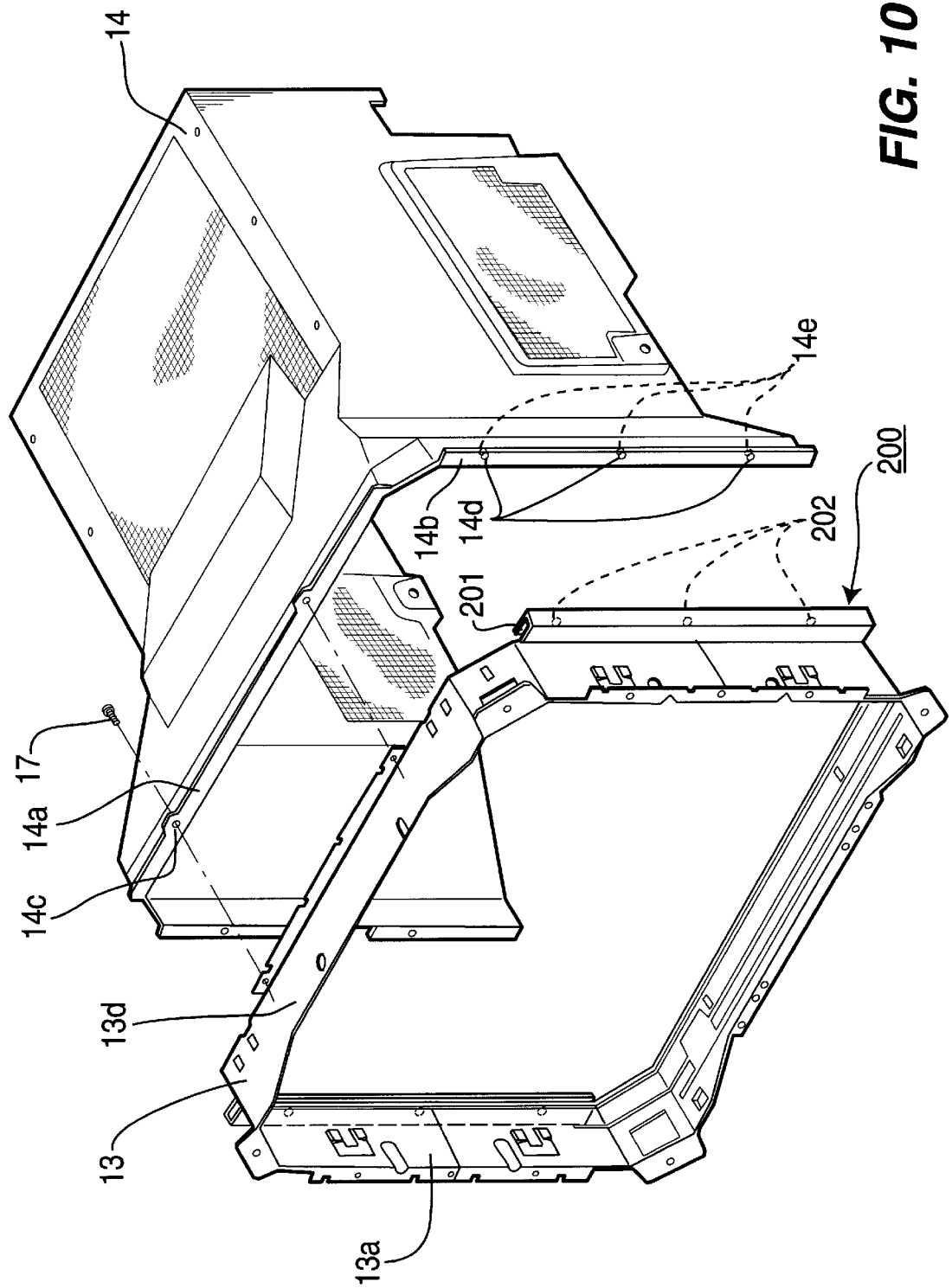
FIG. 10 is an exploded perspective view showing the main part according to another embodiment of the invention.
Figure 11:
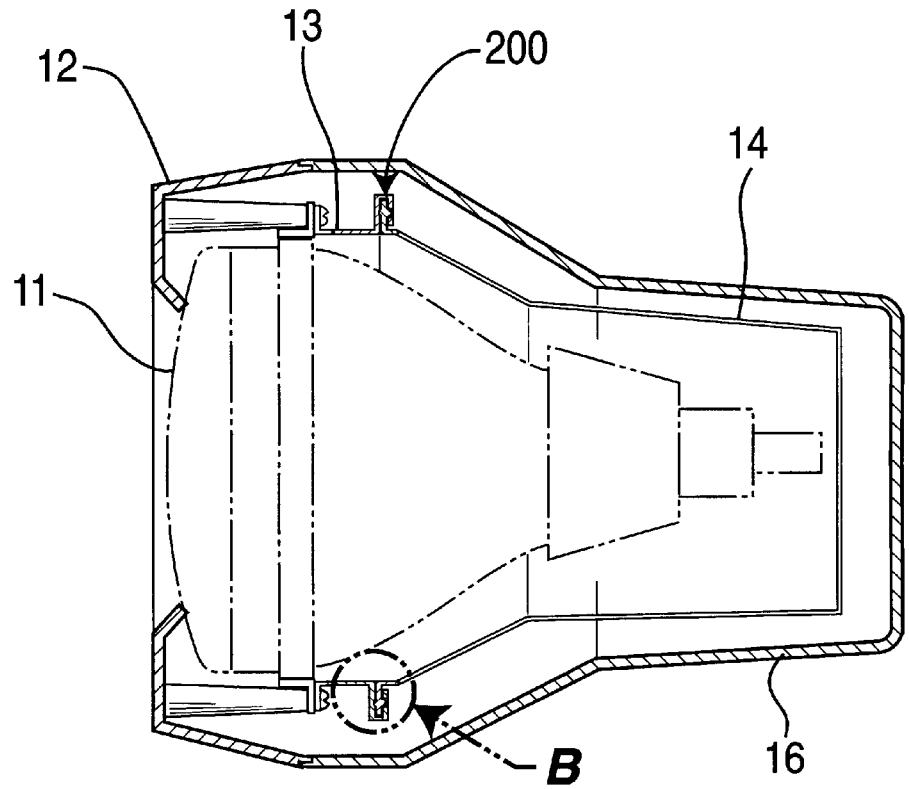
FIG. 11 is a plan sectional view showing the entire structure of the display apparatus according to another embodiment of the invention.
Figure 12:
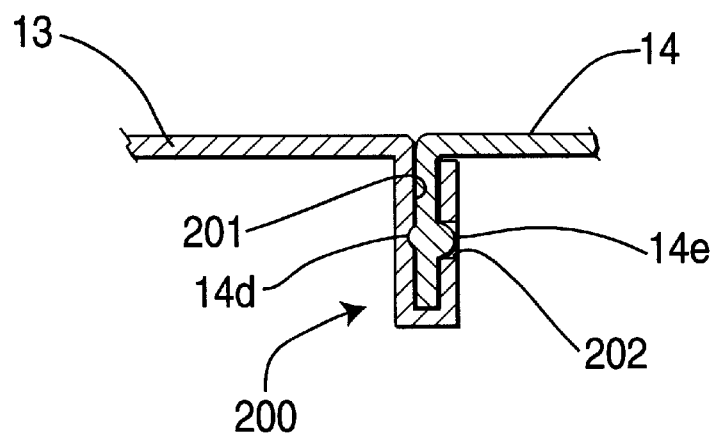
FIG. 12 is an enlarged sectional view of the "B" portion of FIG. 11.

FIGS. 10 to 12 show the display apparatus according to another embodiment of the invention.

Here, the basic structure is the same as in the previous embodiment of the invention, except that a reeve 200 is integrally bent on both sides of the CRT bracket 13 to form the rail mounting means (as opposed to the guiding rail 20 of FIG. 5), thereby forming a rail flute 201. A plurality of fixing holes 202 are formed on the upper portion of the reeve 200 at equal intervals. On the side coupling pieces 14b of the shield cover 14, embossing projections 14e protrude so as to be snapped into each of the fixing holes 202, and embossing projections 14d to prevent tottering protrude on its opposite side. Therefore, during assembly, each of the side coupling pieces 14b of the shield cover 14 is inserted into the rail flute 201 of the reeve 200. In this state, the embossing projections 14e are snapped into the fixing holes 202 and prevent tottering because they are assembled without crack by embossing projections 14d. Thereafter, the upper reeve piece 13d of the CRT bracket 13 and the coupling piece 14a of the shield cover 14, coinciding with each other, are coupled from both sides.

As described above, the invention is designed to have both sides of the shield cover be as guided and coupled by the guiding rail, so that assembly can be simply accomplished by inserting the shield cover and coupling only two screws, thereby enhancing the convenience in assembly. Specifically, when pushing down the shield cover during assembly, if the cover is entangled with the cables below, the assembler holds the shield cover steady, moves the cables out of the way, and pushes down to thereby complete the assembly. Therefore, the invention does not damage the cables and prevents damages to other components. Moreover, as the guiding rail of the invention holds both sides of the shield cover entirely, assembly is more stable. Moreover, productivity of the apparatus is enhanced according to the enhancement of assembly, and provides convenience in modifing or maintaining the product because of the ease of assembly/disassembly.

It will be apparent to those skilled in the art that various modifications and variations can be made in the display apparatus with a shield unit easily mounted of the present invention without departing from the spirit or scope of the invention. Thus, it is intended that the present invention cover the modifications and variations of this invention provided they come within the scope of the appended claims and their equivalents.

What is claimed is:

1. A display apparatus, comprising:

a cathode ray tube for displaying images;

a first cover in which the cathode ray tube is mounted;

a cathode ray tube bracket fixed to the first cover for supporting the cathode ray tube, and having a rear edge on which a reeve is disposed;

a shield cover installed to the rear of the cathode ray tube bracket for shielding an electric field, said shield cover having a front edge on which a coupling unit is disposed;

guiding rail means for coupling the coupling unit with the reeve; and a second cover coupled with the first cover for covering the shield cover;

wherein said coupling unit comprises side coupling pieces which are inserted into respective rail flutes of the guiding rail means, and wherein the cathode ray tube bracket includes an upper reeve piece coupled to an upper coupling piece of the shield cover by screws so that said cathode ray tube bracket and said shield cover thereby coincide with each other.

2. The apparatus as claimed in claim 1, wherein at least one embossing projection is formed on each of the side coupling pieces inserted into the respective rail flutes of the guiding rail means, thereby preventing tottering.

3. The apparatus as claimed in claim 1, wherein said guiding rail means includes a reeve and a coupling snap formed thereon, said coupling snap being snapped into a coupling hole formed on a side of the cathode ray tube bracket.

4. The apparatus as claimed in claim 1, wherein at least one embossing projection is formed on said coupling unit, said guiding rail means comprising rail flutes into which said coupling unit is inserted, thereby preventing tottering.

5. A display apparatus, comprising:

a cathode ray tube for displaying images;

a first cover in which the cathode ray tube is mounted;

a cathode ray tube bracket fixed to the first cover for supporting the cathode ray tube, and including a reeve having a rear portion forming rail flutes;

a shield cover installed to the rear of the cathode ray tube bracket for shielding an electric field, said shield cover having a front edge on which a coupling unit is disposed, said shield cover being coupled to said cathode ray tube bracket by inserting said coupling unit into said rail flute; and a second cover coupled with the first cover for covering the shield cover;

wherein said coupling unit comprises side coupling pieces which are inserted into said rail flutes, and wherein the cathode ray tube bracket includes an upper reeve piece coupled to an upper coupling piece of the shield cover so that said cathode ray tube bracket and said shield cover coincide with each other.

6. The apparatus as claimed in claim 5, wherein a coupling hole is formed on said reeve, and wherein at least one embossing projection is formed on said side coupling pieces of the coupling unit of the shield cover, and wherein at least one other embossing projection is coupled with the coupling hole, thereby preventing teetering.

7. A display apparatus, comprising:

a cathode ray tube for displaying images;

a first cover in which the cathode ray tube is mounted;

a cathode ray tube bracket fixed to the first cover for supporting the cathode ray tube, and having a rear edge on which reeves are disposed, each said reeve extending vertically along a respective side of said cathode ray tube bracket;

a shield cover installed to the rear of the cathode ray tube bracket for shielding an electric field, said shield cover having a front edge on which side coupling pieces are disposed, each said side coupling piece extending vertically along a respective side of said shield cover; and guiding rails, one for each respective side of said cathode ray tube bracket, extending vertically and parallel to said respective sides of said cathode ray tube bracket and said shield cover, each said guiding rail having a flute formed therein for receiving a respective one of said reeves of said cathode ray tube bracket and a respective one of said side coupling pieces of said shield cover, thereby coupling the coupling unit with the cathode ray tube bracket and the shield cover.

8. The apparatus as claimed in claim 7, wherein the cathode ray tube bracket includes an upper reeve piece coupled to an upper coupling piece of the shield cover so that said cathode ray tube bracket and said shield cover coincide with each other.

9. The apparatus as claimed in claim 8, wherein at least one embossing projection is formed on each of the side coupling pieces receiving by the respective flutes of the guiding rails, thereby preventing tottering.

10. The apparatus as claimed in claim 7, wherein each said guiding rail includes a reeve and a coupling snap formed thereon, said coupling snap being snapped into a coupling hole formed on a respective side of the cathode ray tube bracket.

11. The apparatus as claimed in claim 7, wherein at least one embossing projection is formed on each of the side coupling pieces receiving by the respective flutes of the guiding rails, thereby preventing tottering.

12. A display apparatus, comprising:

a cathode ray tube for displaying images;

a first cover in which the cathode ray tube is mounted;

a cathode ray tube bracket fixed to the first cover for supporting the cathode ray tube, and including reeves having respective rear portions forming respective rail flutes, each said reeve extending vertically along a respective side of said cathode ray tube bracket;

a shield cover installed to the rear of the cathode ray tube bracket for shielding an electric field, said shield cover having a front edge on which side coupling pieces are disposed, each said side coupling piece extending vertically along a respective side of said shield cover, said shield cover being coupled to said cathode ray tube bracket by inserting said side coupling pieces into said rail flutes.

13. The apparatus as claimed in claim 12, wherein a coupling hole is formed on each said reeve, wherein at least one embossing projection is formed on said side coupling pieces of the shield cover, and where in at least one other embossing projection is coupled with the coupling hole, thereby preventing teetering.

14. The apparatus as claimed in claim 12, wherein the cathode ray tube bracket includes an upper reeve piece coupled to an upper coupling piece of the shield cover so that said cathode ray tube bracket and said shield cover coincide with each other.

15. The apparatus as claimed in claim 14, wherein at least one embossing projection is formed on each of the side coupling pieces inserted into the rail flutes.

* * * * *